(12) United States Patent
Bennett

(10) Patent No.: US 6,181,262 B1
(45) Date of Patent: Jan. 30, 2001

(54) KEYBOARD SCAN CODE SNOOPER

(75) Inventor: Brian A. Bennett, Smithland, IA (US)

(73) Assignee: Gateway, Inc., N. Sioux City, SD (US)

( * ) Notice: Under 35 U.S.C. 154(b), the term of this patent shall be extended for 0 days.

(21) Appl. No.: 09/071,173

(22) Filed: May 1, 1998

(51) Int. Cl.[7] .................................................. H03K 17/94
(52) U.S. Cl. .......................... 341/26; 341/22; 341/175; 345/168; 708/136
(58) Field of Search ............................... 341/22, 26, 173, 341/175, 176; 340/815.44, 815.74; 345/30, 520, 168; 708/136

(56) References Cited

U.S. PATENT DOCUMENTS

| | | | |
|---|---|---|---|
| 4,908,612 | * 3/1990 | Bromley et al. | 345/158 |
| 5,181,029 | 1/1993 | Kim | 341/20 |
| 5,235,331 | 8/1993 | Sato | 341/26 |
| 5,287,526 | 2/1994 | Wolf et al. | 395/800 |
| 5,457,455 | 10/1995 | Lee | 341/24 |
| 5,642,110 | 6/1997 | Raasch et al. | 341/26 |
| 5,659,308 | 8/1997 | Goff | 341/26 |

* cited by examiner

*Primary Examiner*—Michael Horabik
*Assistant Examiner*—Timothy Edwards, Jr.
(74) *Attorney, Agent, or Firm*—Suiter & Associates PC

(57) ABSTRACT

A keyboard scan code snooper device comprises a microcontroller, a display, and an oscillator. The scan code snooper may be attached to the data and clock lines of a keyboard serial interface connecting a keyboard with a computer in a pass through configuration. The firmware in the microcontroller processes the snooped data transmission from the keyboard to the computer and vice versa, and generates signals appropriate to drive the display.

44 Claims, 4 Drawing Sheets

KEYBOARD SCAN CODE SNOOPER

FIELD OF THE INVENTION

The present invention relates generally to the display of keyboard scan codes and, more particularly, to a device and method for capturing and displaying raw scan codes before being processed by a computer's BIOS, software application, or operating system.

BACKGROUND OF THE INVENTION

The computer keyboard is the primary input device for the entry of commands and data into a computer system. Typically, the computer keyboard employs a grid or matrix of switches. When a key corresponding to a particular intersection of the grid or matrix is pressed a processor built into the keyboard identifies the key by identifying the grid location. For example, where the key matrix employs contact switches, electrical continuity will be present at a particular column and row of the matrix. Other types of switches may also be employed, such as capacitive switches wherein a change in capacitance of the circuit corresponding to a particular column and row may be detected by the keyboard processor.

The keyboard processor performs several functions, including debouncing the keystrokes, i.e., filtering very rapid on-off cycles that may occur where a key switch makes contact, determining how long a key has been pressed, and interpreting multiple or simultaneous key strokes.

After reading the key matrix and debouncing the keypress signal, the keypress is converted to a scan code corresponding to the particular key pressed and the scan code data is sent via a serial interface to a keyboard controller located on the main logic board or motherboard of the computer. The keyboard controller sends an interrupt signal and then sends the data to the CPU. In some older systems, the raw scan code data is transferred to the CPU and the scan code is translated by a subroutine running on the CPU, however, in most systems, the keyboard controller translates the scan code. Scan codes are typically sent in 11-bit data packets consisting of 8 data bits and three framing and control bits.

There are many instances where it would be desirable to capture and display the raw scan codes directly as they are sent from the keyboard. Where the keyboard serial interface is bidirectional, it would also be useful to be able to capture and display the data sent from the computer to the keyboard. It would be useful to be able to view scan codes when troubleshooting and diagnosing apparent keyboard malfunctions in order to determine if the malfunction is in the key switches, the keyboard processor, the serial interface cable, the keyboard controller, the motherboard, a fuse where the keyboard and mouse connectors are fuse protected, etc. For example, when a key is stuck or fails, the power-on self test (POST) or other diagnostic software may report it. However, the POST included in the basic input/output system (BIOS) of some systems may report only that the keyboard has a stuck key, but may fail to state which key it is, leaving it to the user to find out which key it is.

Software applications exist which will display scan code data to the system display monitor, however, what is displayed is not the raw scan code data itself, but rather, scan code data that is regenerated after the raw scan code data itself has been translated or otherwise processed.

It would, therefore, be desirable to provide an apparatus and method for the capture and display of scan code data wherein the scan code data is in its raw form and has not been deciphered or processed by any software application, operating system, or by the ROM BIOS of the main logic board or of the keyboard controller.

SUMMARY OF THE INVENTION

It is, therefore, an object of the present invention to provide a device capable of capturing and displaying raw scan code data and is advantageous in that the raw scan code data is captured and displayed independently of any BIOS, operating system, or software application of the computer.

Another object of the present invention is to provide a method of capturing and displaying raw scan code data that is independent of any BIOS, operating system, or software application of the computer.

These and other objects and advantages are provided by the keyboard scan code snooper according to the present invention comprising a microcontroller and a display which may be attached to the data and clock lines of the keyboard/computer via a pass through connection. The firmware in the microcontroller processes the snooped data transmission from the keyboard to the computer and vice versa.

It is to be understood that both the foregoing general description and the following detailed description are exemplary and explanatory only and are not restrictive of the invention as claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

The detailed description of the invention may be best understood when read in reference to the accompanying drawings wherein.

DETAILED DESCRIPTION OF THE INVENTION

Figure 1:
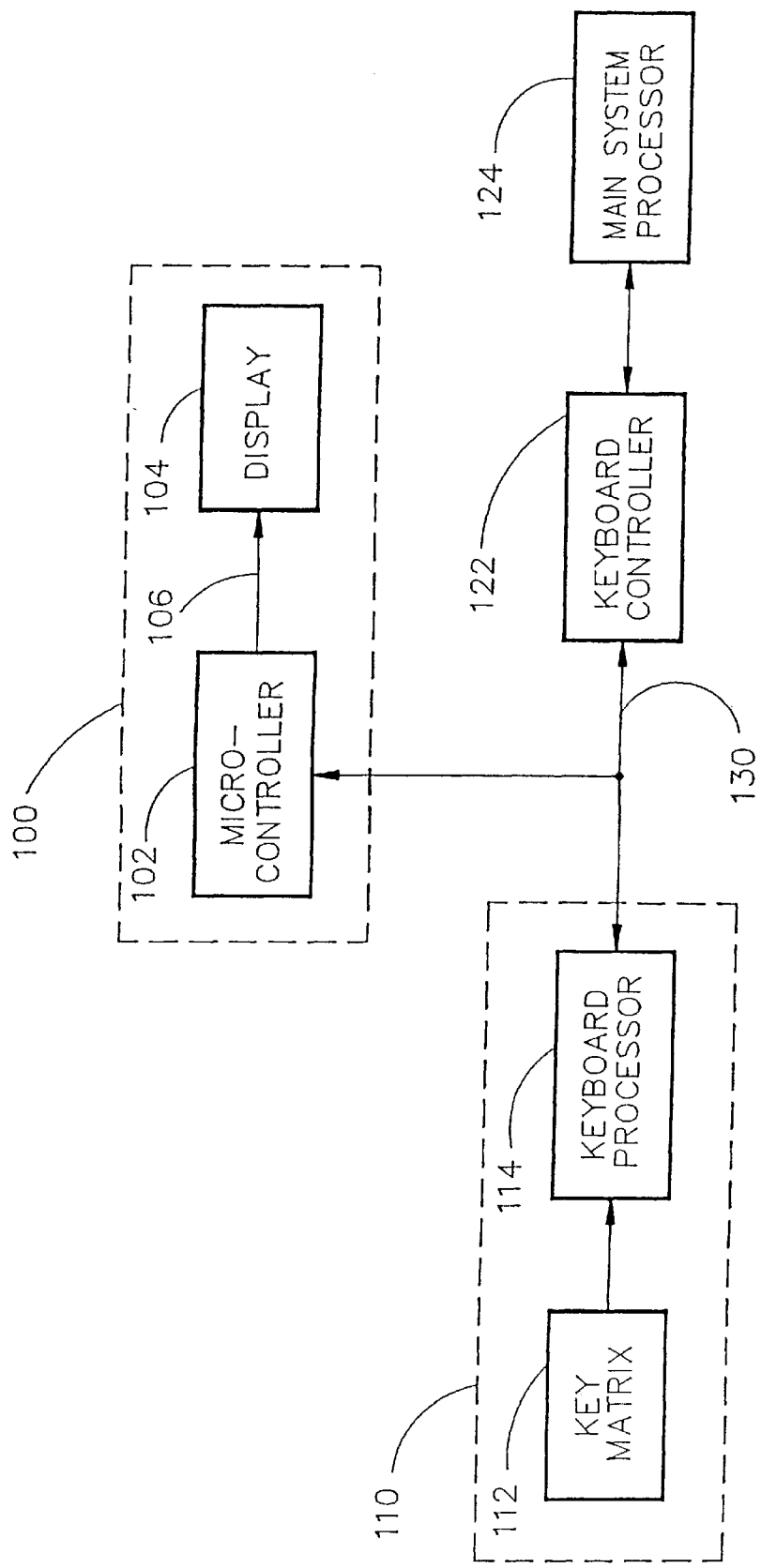
FIG. 1 shows a block diagram of the keyboard scan code snooper according to the present invention.

FIG. 1 depicts the keyboard scan code snooper 100 and its interconnection to a computer system via serial keyboard interface connection 130 connecting keyboard 110 to a computer system via a keyboard controller 122 which will generally be on the main logic board of the computer system.

Keyboard 110 comprises a key matrix 112 made up of columns and rows and wherein each key of the keyboard corresponds to an intersection of a particular row and column. By scanning the columns with an clock pulse and detecting output for each row, for example via a short circuit created by the key press at a given row and column in the case of a keyboard employing mechanical key switches, or, in the case of a keyboard employing capacitive key switches, via a change in the capacitance of the switch which may be detected by comparator circuitry in the keyboard.

When a key is pressed, keyboard processor 114 identifies which key is pressed by identifying the grid location of the key in key matrix 112. The keyboard processor 114 also performs other functions such as debouncing the keypress, determining the duration of the keypress, e.g., for typematic entry. The keyboard processor 114 converts the keypress into a scan code which is transmitted to keyboard controller 122 via keyboard serial data link 130. The scan code is transmitted serially as 11-bit packets consisting of 8 data bits and 3 framing and control bits. Keyboard controller 122 generates an interrupt signal and then transmits the data to the main system processor 124. The scan code may be translated, e.g., into ASCII code, by keyboard controller 122 prior to transmission to the main system processor 124, or, where the keyboard controller is of the type that does not have the scan code interpreting function, the interrupt signal serves to initiate a subroutine allowing the scan code to be translated by the main system processor 124.

Scan code snooper 100 comprises microcontroller 102 and a display 104. Microcontroller 102 is connected to the keyboard serial connection 130 between keyboard 110 and the computer in a pass through fashion. In this manner, the scan code that is sent to keyboard controller 122 is also sent to microcontroller 102. Microcontroller 102 generates signals appropriate to drive the display.

Exemplary keyboard processors (114) include, but are limited to, Intel 8048 or 8049 microcontroller chips, chips compatible with the 8048 or 8049 chips such as the Motorola 6805 processor, and the like.

Exemplary keyboard controllers (122) include, but are not limited to, the Intel 8255 Programmable Peripheral Interface (PPI) chip, the Intel Universal Peripheral Interface (UPI) chips, such as the 8041, 8042, 8741, 8742 chips, and the like.

The display is preferably a small liquid crystal display (LCD), although any other type of display may be employed, such as a gas plasma display. Since the scan code data contains eight data bits, this data can be conveniently displayed as two hexadecimal digits, although the display format is not limited to any number system and the scan codes may be displayed in any desired format, such as binary, octal, decimal, etc. The display format is preferably hexadecimal since even a rudimentary display capable of displaying two digits may be utilized for displaying scan code data since the data portion of the scan code information packer is 8 bits in length. As such, a display such as an LCD or LED display capable of displaying two seven-segment digital display digits which is capable of displaying the numerals "0" through "9" as well as the letters "A" through "F" (wherein the letters "B" and "D" may be displayed in lower case in order to avoid confusion with the numbers "8" and "0" respectively).

Figure 2:
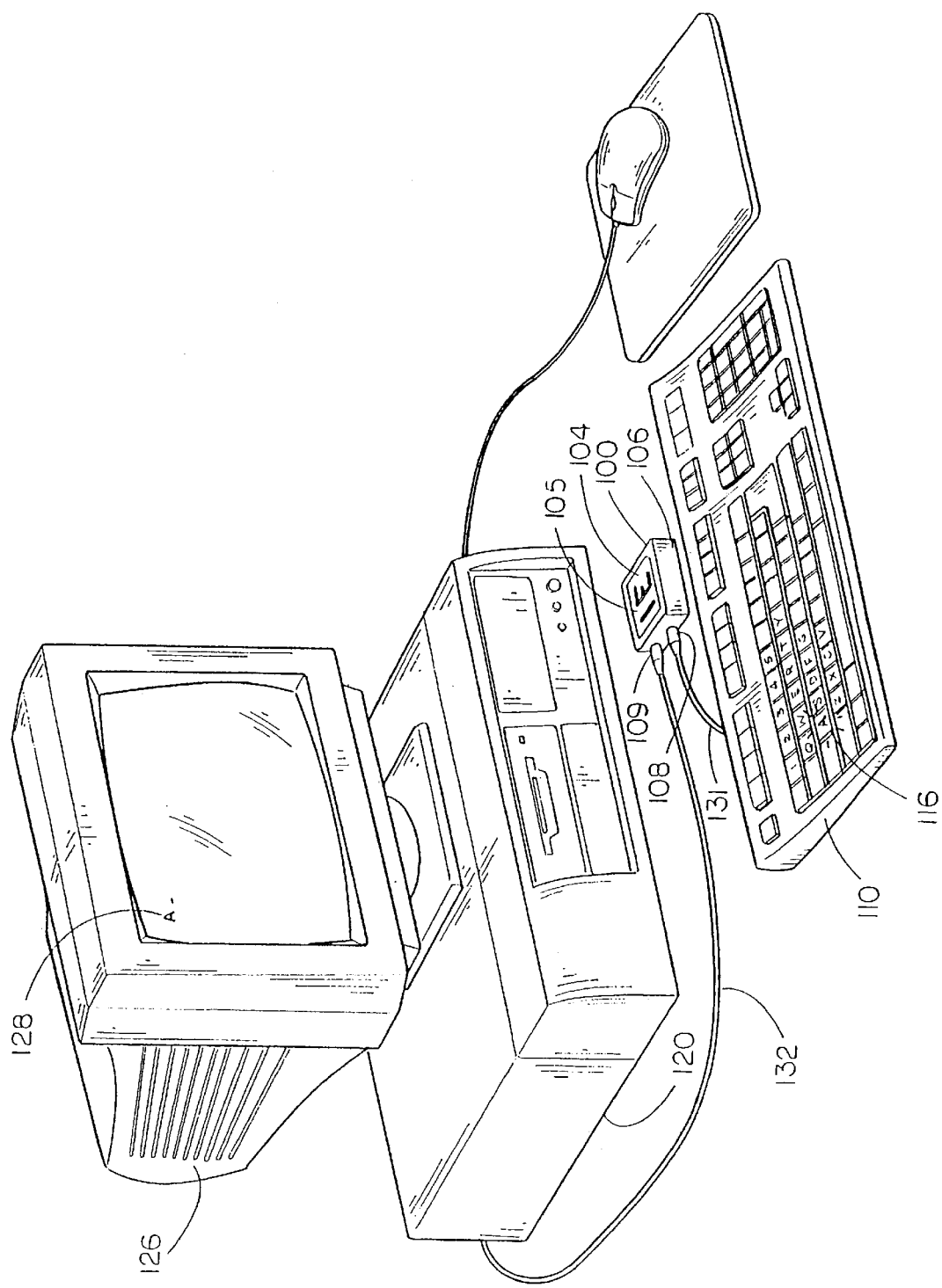
FIG. 2 is a perspective view of a presently preferred embodiment according to the present invention.

FIG. 2 shows a perspective view of a preferred embodiment of the present invention wherein the scan code snooper 100 is implemented as a physical device that may be conveniently placed between the computer 120 and keyboard 110. Snooper 100 comprises a display 104, such as an LCD display, and a housing 106. One end of cable 131 plugs into the serial interface port connector (not shown) of keyboard 110 and the other end plugs into input connector 108 located on housing 107. One end of cable 132 plugs into snooper output connector 109 located on housing 107, and the other end plugs into serial interface port connector (not shown) of computer 120. The signal carried on cable 131 and input via connector 108 is preferably allowed to pass through to output connector 109 and cable 132 independently of the circuitry contained within snooper 100, for example, by connecting the circuitry of snooper 100 in parallel. It should be noted that connectors 108 and 109 are described as input and output, respectively, from the perspective of keyboard scan codes being sent to the computer. However, where the keyboard interface is bidirectional, data sent from the computer to the keyboard, such as, for example, CAPS LOCK on or off, NUM LOCK on or off, SCROLL LOCK on or off, keyboard speed, i.e., typematic function parameters such as delay and rate parameters, and the like, can also be snooped and displayed with the snooper 100 according to the present invention.

The keyboard scan code snooper 100 operates as follows. When a key on keyboard 110 is pressed, the scan code according to the key pressed is output to snooper 100 and simultaneously passes through to computer 120. For example, when the key 116 corresponding to the letter "a" is pressed, the keyboard processor 114 (FIG. 1) outputs a the binary scan code in which the 8 data bits are "0001, 1110." Although the scan code could be displayed on LCD 104 in binary form, it is preferable to display the data in its two-digit hexadecimal format "1E" shown as indicia 105 on display 104 depicted in FIG. 2.

The scan code also passes through and is translated, either by keyboard controller 122 (FIG. 1) or the main system processor 124 (FIG. 1) and the appropriate response to the input is executed by the main system processor. For example, the translation may involve translating the scan code to the appropriate ASCII code, i.e., "0110 0001" or hex "61" in the case of a lower case "a." The appropriate response to the input may be, for example, displaying the ASCII character on the display, whereupon indicia 128 would be displayed on display 126.

Figure 3:
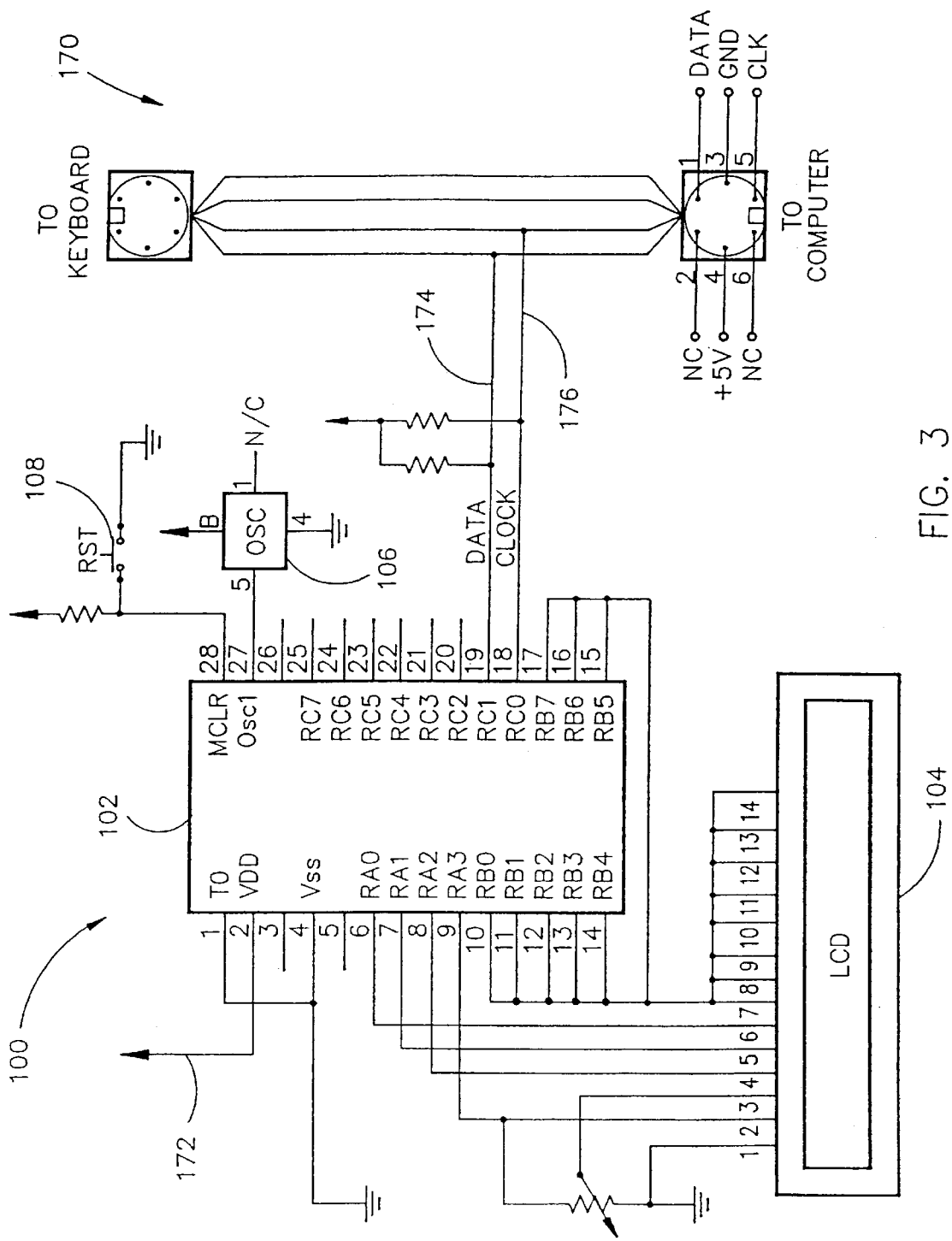
FIG. 3 shows a schematic of a presently preferred embodiment according to the present invention.

FIG. 3 shows a schematic diagram of a preferred embodiment according to the present invention. Keyboard scan code snooper 100 employs microcontroller 102. Any microcontroller or microcomputer capable of receiving the keyboard scan code data and driving a display, such as an LCD or LED display, may be used, preferably a microcontroller or microcomputer that is implemented on a single integrated circuit. FIG. 3 depicts an embodiment employing a PIC16C57 microcontroller available from Microchip Technology Inc. Oscillator 106, which may be a crystal controlled oscillator circuit, is provided to provide a clock pulse to synchronize the operation of the circuitry in microcontroller 102. Oscillator 106 output is injected into pin 27 of microcontroller 102.

A reset button 108 is provided and injected into pin 28 to clear the memory and initialize microcontroller 102. The +5 v line 172 (typically pin 4 when the keyboard/computer interface uses connectors of the 6-pin mini-DIN type) is injected into pin 2 of microcontroller 102. Data line 174 (typically pin 1 when the keyboard/computer interface uses connectors of the 6-pin mini-DIN type) is injected into pin 19 of microcontroller 102, and the keyboard clock signal line 176 (typically pin 5 when the keyboard/computer interface uses connectors of the 6-pin mini-DIN type) is injected into pin 18 of microcontroller 102.

Microcontroller 102 receives the snooped keyboard data transmission and the firmware in microcontroller 102 processes the snooped data and drives the LCD 104 which is used to display the decoded information.

Although the present invention is shown and described in FIG. 3 with reference to a 6-pin mini-DIN connector typically employed with PC compatible systems wherein pin 1 carries the keyboard data signal, pin 2 is not connected, pin 3 is the ground, pin 4 carries the +5 v signal, and pin 6 is not connected. In addition to the 6-pin mini-DIN connector, other typical keyboard connectors include, for example, the 5-pin DIN connector, the 6-pin SDL (shielded data link) connector, and the like. For a 5-pin DIN keyboard connector, pin 1 carries the keyboard clock signal, pin 2 carries the keyboard data signal, pins 3 and 6 are not connected, pin 4 is the ground, and pin 5 carries the +5 v signal. For a 6-pin SDL connector, pins A and F are not connected, pin B carries the keyboard data, pin C is the ground, pin D is the keyboard clock, and pin E carries the +5 v signal.

FIG. 2 depicts the scan code snooper 100 according to the present invention as being enclosed in a self-contained housing sized to be placed adjacent to the keyboard or between a keyboard and the computer. However, embodiments employing other housing configurations are possible. For example, in FIG. 4, an embodiment wherein the keyboard scan snooper 200 according to the present invention is integrated with a mouse pad is shown.

Figure 4:
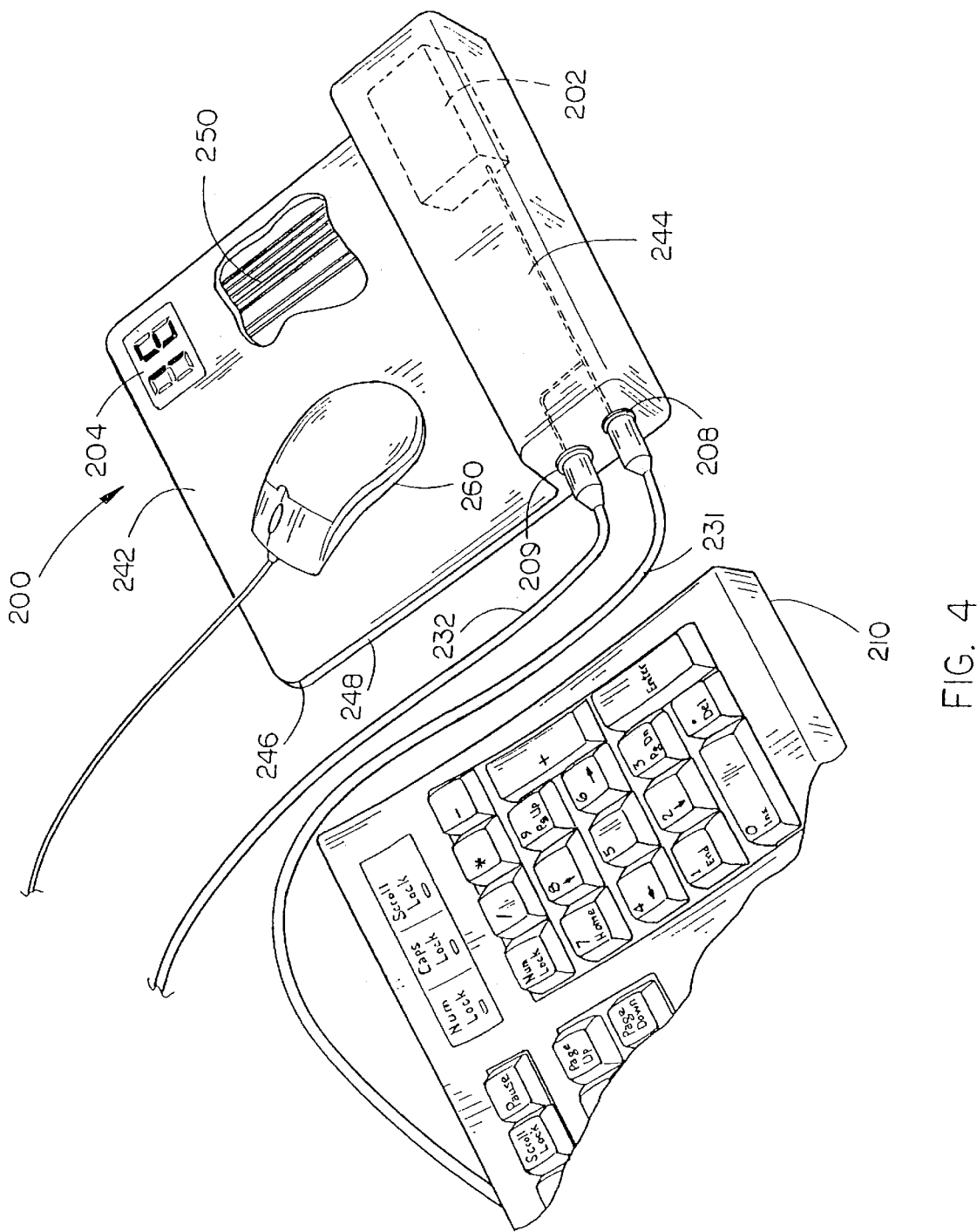
FIG. 4 is a perspective view an embodiment according to the present invention wherein the keyboard scan snooper according to the present invention is integrated with a mouse pad.

In FIG. 4, mouse pad scan code snooper 200 is shown as having a mouse operation surface 242 and a wrist pad or wrist rest area 244. Wrist pad area 244 is advantageously padded or foam filled, and ergonomically enhances mouse operation by providing a support 244 upon which a user may place his or her wrist during the operation of the mouse 260. It is advantageous to enclose the microcontroller 202 and the associated componentry within the wrist pad 244, e.g., within a cavity or recess formed therein. It is also advantageous to removably enclose the microcontroller 202 therein or otherwise provide access thereto for servicing. A display such as an LED display 204 may be disposed within a recess formed in mouse surface 242 as to be visible to a user and is preferably substantially flush with the mouse rolling surface 242 so as not to interfere with mouse operation. Preferably, mouse roller surface will comprise a transparent or translucent overlay or laminate 246, preferably of a plastic material which is suitably texture for mouse operation and which will provide a protective overlay for the display 204. Beneath overly 246 is a foam or other padded member 248. Display 204 may be housed within a recess formed in the foam member 248, with overlay 246 covering the display 204. An LCD display may be provided in place of LED display 204. The LED 204 is connected to the microcontroller 202 via display signal lines 250. Lines 250 extend beneath overlay 246. In a preferred embodiment, the padding member 248 may comprise two or more layers so that display lines 250 may extend there between and thus not be visible to the user.

Although the embodiment shown in FIG. 4 shows the placement of connectors 208 and 209 in a position more advantageous for right-handed operation of mouse 260, the mouse pad scan code snooper 200 could also be adapated for left-handed use by disposing connectors 208 and 209 on the opposite side of the device, or the snooper 200 according to the present invention may be equipped with an additional set of connectors that would enable the mouse pad scan code snooper 200 to be used on either side of keyboard 210. It is also contemplated that mouse data can also be captured and displayed in a substantially similar fashion by plugging cable 232 into the motherboard mouse port (not shown), plugging the connector (not shown) of mouse 260 into connector 208 of the mouse pad 200, and plugging the keyboard cable 231 directly into the computer system's keyboard port (not shown).

In embodiments not shown, the scan code snooper could be contained within a housing that attaches to or is integral with the housing of the keyboard, or could be disposed within the keyboard with the display disposed on the surface of the keyboard housing. In other embodiments (not shown) the snooper could be mounted on an outer surface of a video display monitor or could be incorporated with a video display monitor by enclosing the circuitry within a video display monitor housing wherein the small LCD display of the snooper is located on the surface thereof on the periphery of the video display monitor. Alternatively, in another embodiment (not shown), the device could be housed within a video display support, keyboard support such as a keyboard tray or an under-desk keyboard drawer, or any like tray, stand, or support that would likely be used with or near a computer system. In another embodiment (not shown), the snooper may be mounted on or attached to the computer case, or, may be mounted or housed within a computer case wherein the snooper display being visibly disposed on or externally of the case. In yet another embodiment (not shown), the device could be housed within, and having an LCD or LED display mounted substantially flush with a surface thereof, other types of computer devices or accessories, such as within a mouse pad not having a wrist pad, a keyboard wrist pad of the type that extends along the length of the keyboard between the user and the keyboard upon which a user may place his or her wrists during keyboard input, or the like.

Although the invention has been described herein primarily in reference to keyboard scan codes, the snooper according to the present invention can likewise be used with any device which uses a PS/2 port such as the motherboard min-DIN mouse port, or motherboard mouse ports having a pin-header type connector wherein an adapter may be employed to adapt the pin header connector on the motherboard to the min-DIN mouse connector. Such device include the mouse, track ball, touch pads using conductive and/or resistive sheets or layers, capacitive touch pads, digitizing tablets, active or passive stylus input devices, joysticks, stick pointers employing pressure transducers, and the like. For example, when a mouse is employed, data corresponding to x- and y-axis movement, left click, right click, double click, drag, etc., may be captured and displayed.

The description above should not be construed as limiting the scope of the invention, but as merely providing illustrations to some of the presently preferred embodiments of this invention. In light of the above description and examples, various other modifications and variations will now become apparent to those skilled in the art without departing from the spirit and scope of the present invention as defined by the appended claims. For example, in the depicted embodiment the scan code data is sent simultaneously and in its raw state to both the scan code snooper according to the present invention and the computer system. However, the keyboard scan codes could likewise be passed to the computer after processing by the snooper microcontroller. Also, the input device need not be limited to those input devices described herein, and may be any device which outputs scan code data, including, for example, devices for converting data not generally compatible with the keyboard serial interface, such as RS-232 serial data and the like, to keyboard serial interface compatible key scan codes for emulating keyboard input, running keystroke input macros, etc. Accordingly, the scope of the invention should be determined solely by the appended claims and their legal equivalents.

What is claimed is:

1. An apparatus for the capture and display of data encoded within an input signal, said input signal for input into computer system, said apparatus comprising:

a microprocessor for receiving, processing, and outputting said data encoded within said input signal;

an oscillator operably connected to said microprocessor, said oscillator for synchronizing the receiving, processing, and outputting operations of said microprocessor; and a display operably connected to said microprocessor for proving visual output of said data;

wherein said apparatus further comprises circuitry allowing the input signal to be input into both said microprocessor and said computer system, and wherein said input signal is received by said microprocessor prior to the computer system processing said data, and wherein said display is suitable for providing visual output corresponding to said data received by said microprocessor.

2. The apparatus according to claim 1, wherein said input signal comprises keyboard scan code data.

3. The apparatus according to claim 2, wherein said visual output is in hexadecimal display format.

4. The apparatus according to claim 3, wherein said display is an LCD display.

5. The apparatus according to claim 3, wherein said display is an LED display.

6. A method for the capture and display of data encoded within an input signal, said input signal for input into a computer system, said method comprising the steps of:

splitting said input signal into two input signals;

inputting one of said two input signals into a microprocessor prior to the computer system processing said data;

inputting the other of said two input signals into said computer system;

processing said input signal by said microprocessor; and outputting said data from said microprocessor to a display.

7. The method according to claim 6, wherein said input signal comprises keyboard scan code data.

8. The method according to claim 7, wherein said data is displayed in hexadecimal format.

9. The method according to claim 8 wherein said data is displayed in hexadecimal format.

10. A method for the capture and display of data encoded within an input signal, said input signal for input into a computer system, said method comprising the steps of:

inputting said input signal into a microprocessor;

processing said input signal by said microprocessor; and outputting said data from said microprocessor to a display, wherein the microprocessor is configured to capture the input signal prior to the computer system processing the information.

11. The method according to claim 10 wherein said input signal comprises keyboard scan code data.

12. A keyboard system comprising:

a keyboard, said keyboard comprising a matrix of key switches and a keyboard processor, wherein said key switch matrix is operable by a user by pressing keys capable of activating said key switches and wherein said keyboard processor is capable of generating and outputting scan code data, said scan code identifying to a computer system the key press of a particular key;

a microcontroller operably interfaced to said keyboard processor, said microcontroller receiving said scan code data from said keyboard processor prior to the computer system processing said scan code data; and a display operably coupled to said microcontroller, said display providing visual output of said scan code data received by said microcontroller from said microprocessor.

13. The keyboard system according to claim 12, further comprising interface circuitry which allows said keyboard processor to be further operably interfaced to a host computer system, wherein the interface allowing receipt of said scan code data by said microcontroller from said keyboard processor prior to the computer system processing said scan code data does not interfere with the further operable interfacing of said keyboard controller with a host computer system.

14. A computer system comprising:

a host computer comprising a main system processor and a keyboard controller, said keyboard controller for controlling the communication between a keyboard and the main system processor;

a keyboard comprising a matrix of key switches and a keyboard processor, wherein said key switch matrix is operable by a user by pressing keys capable of activating said key switches, wherein said keyboard processor is capable of generating and outputting scan code data, said scan code identifying to a said host computer the key press of a particular key, and wherein said keyboard processor is operably interfaced with said keyboard controller;

a microcontroller operably interfaced to said keyboard processor, said microcontroller receiving said scan code data from said keyboard processor prior to the computer system processing said scan code data; and a display operably coupled to said microcontroller, said display providing visual output of said scan code data received by said microcontroller from said microprocessor.

15. The computer system according to claim 14, wherein the keyboard processor is operably interfaced to a host computer system, and wherein said interface between the keyboard processor and the microcontroller does not interfere with said interface between the keyboard processor and the keyboard controller.

16. An apparatus for the capture and display of information, the information for input into a computer system for processing, said apparatus comprising a display operably connected to circuitry for providing output of the information, the circuitry configured to capture the information prior to the computer system processing the information, and wherein said display is suitable for providing an output corresponding to said information received by said circuitry.

17. An apparatus for the capture and display of information, the information for input into a computer system for processing, said apparatus comprising circuitry for providing display of said information wherein said display of said information is performed without any deciphering or processing by any BIOS, operating system, or software application of said computer.

18. An apparatus for the capture and display of information, for input into a computer system for processing, said apparatus comprising:

circuitry configured to capture the information prior to the computer system processing the information; and a display operably connected to said circuitry for providing visual output of the captured information.

19. The apparatus according to claim 18 wherein said information comprises keyboard scan code data.

20. The apparatus according to claim 18 wherein said display is an LCD display.

21. The apparatus according to claim 18 wherein said display is an LED display.

22. The apparatus according to claim 18 wherein said information comprises encoded data.

23. The apparatus according to claim 22 wherein said microprocessor outputs said encoded data for display in hexadecimal display format.

24. The apparatus according to claim 18, further comprising a housing containing said circuitry and said display, wherein said display is disposed within said housing so as to be viewable to a user.

25. The apparatus according to claim 24, wherein said housing comprises a body and wherein said circuitry and said display are integrated within said body.

26. The apparatus according to claim 25, wherein at least a portion of said body forms a generally flat surface of a type suitable for actuating a roller ball mechanism of a mouse in response to a user sliding a mouse over said generally flat surface.

27. A method for the capture and display of information, the information for input into a host computer system for processing, said method comprising the steps of:
   prior to the computer system processing the information, capturing the information; and displaying the information captured.

28. The method according to claim 27 wherein said information comprises keyboard scan code data.

29. The method according to claim 27 wherein said information comprises encoded data.

30. The method according to claim 29 wherein said encoded data is displayed in hexadecimal format.

31. A keyboard system comprising:
   a keyboard configured to input information into a computer system for processing;
   circuitry configured to capture the information prior to the computer system processing the information; and
   a display operably coupled to said circuitry for providing visual output of the captured information.

32. The keyboard system according to claim 31 wherein said information comprises keyboard scan code data.

33. The keyboard system according to claim 31 wherein said display is an LCD display.

34. The keyboard system according to claim 31 wherein said display is an LED display.

35. The keyboard system according to claim 31 wherein said information comprises encoded data.

36. The keyboard system according to claim 35 wherein said microprocessor outputs said encoded data for display in hexadecimal display format.

37. A computer system comprising:
   a computer;
   a keyboard configured to input information into a computer system for processing;
   circuitry configured to capture the inputted information prior to the computer system processing the information; and
   a display operably coupled to said circuitry for providing visual output of the captured inputted information.

38. The computer system according to claim 37 wherein said information comprises keyboard scan code data.

39. The computer system according to claim 37 wherein said display is an LCD display.

40. The computer system according to claim 37 wherein said display is an LED display.

41. The computer system according to claim 37 wherein said information comprises encoded data.

42. The computer system according to claim 41 wherein said microprocessor outputs said encoded data for display in hexadecimal display format.

43. A method for testing an input device, comprising the steps of:
   generating an input signal for input into a host computer system for processing, said input signal comprising data having a predetermined value;
   prior to the computer system processing the information, capturing the data contained in said input signal;
   displaying a value corresponding to the data captured; and
   comparing the displayed value with the predetermined value.

44. The method according to claim 43 wherein said input signal comprises keyboard scan code data.

* * * * *